(12) United States Patent
Weil

(10) Patent No.: US 7,375,939 B2
(45) Date of Patent: May 20, 2008

(54) RELOCATABLE POWER TAP WITH GROUND-NEUTRAL FAULT DETECTOR

(75) Inventor: Eugene A. Weil, Benton Harbor, MI (US)

(73) Assignee: Trippe Manufacturing Co., Chicago, IL (US)

( * ) Notice: Subject to any disclaimer, the term of this patent is extended or adjusted under 35 U.S.C. 154(b) by 0 days.

(21) Appl. No.: 11/507,290

(22) Filed: Aug. 21, 2006

(65) Prior Publication Data

US 2008/0043387 A1 Feb. 21, 2008

(51) Int. Cl.
*H02H 3/16* (2006.01)
(52) U.S. Cl. ........................................ 361/45
(58) Field of Classification Search ............... 361/45
See application file for complete search history.

(56) References Cited

U.S. PATENT DOCUMENTS

| | | | |
|---|---|---|---|
| 3,857,096 A * | 12/1974 | Gregory | 324/127 |
| 4,837,455 A | 6/1989 | Sleator | |
| 5,157,273 A | 10/1992 | Medendorp et al. | |
| 5,270,576 A | 12/1993 | Kahle | |
| 5,363,269 A * | 11/1994 | McDonald | 361/45 |
| 5,729,417 A * | 3/1998 | Neiger et al. | 361/45 |
| 5,757,598 A | 5/1998 | Aromin | |
| 5,963,408 A * | 10/1999 | Neiger et al. | 361/45 |
| 5,999,384 A | 12/1999 | Chen et al. | |
| 6,040,969 A | 3/2000 | Winch et al. | |
| 6,232,675 B1 | 5/2001 | Small | |
| 6,501,195 B1 | 12/2002 | Barton | |
| 6,528,902 B1 | 3/2003 | Barton | |
| 6,560,079 B1 | 5/2003 | Hirsh et al. | |
| 6,586,849 B2 | 7/2003 | Tarr | |
| 6,991,495 B1 | 1/2006 | Aromin | |
| 2002/0185916 A1 | 12/2002 | Barton et al. | |
| 2003/0193243 A1 | 10/2003 | Rupert et al. | |

* cited by examiner

*Primary Examiner*—Michael J Sherry
*Assistant Examiner*—Lucy Thomas
(74) *Attorney, Agent, or Firm*—Michael Best & Friedrich LLP

(57) ABSTRACT

A relocatable power tap having a plug configured to connect to a source of AC power and at least one receptacle. The relocatable power tap also includes a power supply connected to the plug and configured to convert an AC signal to a DC signal, and a detector connected to the plug and configured to determine the existence of ground and polarity faults. The detector includes a first current-controlled switch configured to turn on if an open ground or polarity fault exists. A power switch is controlled by the detector. The power switch is connected to the power supply, and configured to communicate AC power from the source of AC power to the at least one receptacle based on whether a ground or polarity fault exists.

21 Claims, 2 Drawing Sheets

RELOCATABLE POWER TAP WITH GROUND-NEUTRAL FAULT DETECTOR

BACKGROUND

In many instances, the number of wall sockets available to access electrical power is inadequate. In those situations, a power strip or similar device may be used to provide additional receptacles. Generally, power strips include a strip of electrical outlets or receptacles in a housing. The receptacles in the housing are connected to an electrical cord with a plug designed to be inserted into a wall outlet. As is well known, a typical wall outlet (in the U.S.A.) is wired to provide a single-phase, 120 V, AC signal and includes three contacts: a live or hot contact (or lead or conductor), a neutral contact, and a ground or earth contact. Power strips are also known as plug boards, power boards, power bars, distribution boards, gangplugs, and multiboxes. Underwriters Laboratories Inc. ("UL") refers to power strips as "relocatable power taps" (each an "RPT"). Hereafter, the term relocatable power tap will be used as a generic term to encompass all forms of such devices.

Although RPT's have been in use for many years, there has been some controversy regarding their use in hospitals, dental and doctor offices, and other healthcare facilities. Many healthcare facilities are faced with an increasing use of patient monitoring devices, medication dispensers, and other electrical devices that, of course, must be provided with electrical power. As a consequence, some medical facilities use RPT's to provide extra electrical outlets in order to power the increasing number of devices used in the healthcare industry. Like many electric devices, RPT's may be subject to compliance with the National Electric Code ("NEC"). In addition, customers (e.g., hospitals) and manufactures may desire that RPT's be certified by recognized agencies or testing laboratories, such as UL. However, UL has published guidelines that indicate that RPT's that undergo UL's certification are not intended for use in healthcare facilities even when the RPT's include individual components that meet so-called hospital grade standards.

As a consequence, many healthcare facilities are left with unsatisfactory choices: use a non-certified RPT or install additional fixed outlets (e.g., wall outlets). Of course, it is often impractical to install more fixed outlets because, for example, the installation would require cutting open walls, floors, or ceilings and running additional wiring from electrical service panels to the desired location, and these types of construction activities often require shutting down a healthcare facility. Further, using extra wall outlets is often less desirable than using an RPT because when devices are connected to wall outlets a power cord is strung or laid out from the device to wall. When multiple devices are connected in this fashion, multiple cords presenting multiple tripping and obstruction hazards are present in the healthcare area. In contrast, by their very nature, RPT's allow multiple cords to be connected to a single location (the group or strip of receptacles of the RPT). Further, the RPT may be placed on, e.g., an equipment cart, and a single power cord (the RPT's cord) run or routed to the wall outlet.

SUMMARY

As a consequence, it would be desirable to have a hospital-grade RPT that meets the requirements of widely adopted electrical codes, such as Article 517 of the NEC, as well the requirements of certification agencies, such as UL Standard 60601-1.

As noted, an RPT is designed to connect several pieces of electrical equipment to a single branch circuit outlet via a single power cord with an attachment plug. The grounding pin of the RPT attachment plug is generally the route through which potentially hazardous leakage current is grounded. Under UL standards, RPT's must meet strict requirements with respect to reducing electrical shock hazards. Shock hazards can be caused by electrical faults, including a loss of ground or ground fault.

The grounding pin in an RPT attachment plug is the means to route potentially hazardous leakage current to ground. Since each piece of medical equipment attached to the RPT contributes a certain amount of leakage current, the accumulated leakage current of several pieces of medical equipment may create the risk of electric shock in the absence of a proper ground. A ground fault may occur for a variety or reasons. For example, a ground fault may occur if the grounding pin of the RPT attachment plug is damaged or removed.

Other electrical faults, such as a polarity reversal (caused, e.g., by inadvertently switching the hot and neutral wires in an outlet) can also be problematic. For example, a polarity reversal in a wall outlet may cause a device connected to the RPT to malfunction.

Accordingly, in one embodiment, the invention provides a relocatable power tap which cuts off power to or prevents power from being provided to the receptacles in the RPT when a ground fault is detected. The relocatable power tap also cuts off power to or prevents power from being supplied to the receptacles in the RPT if a reverse polarity situation has occurred.

In another embodiment, the invention provides a relocatable power tap having at least one receptacle, and a power supply configured to convert an AC power signal to a DC power signal (or, more simply, AC power to DC power). A detector is configured to determine the existence of ground and polarity faults. A power switch is controlled by the detector, connected to the power supply, and configured to provide AC power from a source to the at least one receptacle according to whether the fault detector determines whether a fault exists.

In another embodiment, a relocatable power tap having a plug configured to connect to a source of AC power and at least one receptacle is provided. The relocatable power tap also includes a power supply connected to the plug and configured to convert AC power to DC power. A fault detector is connected to the plug and configured to determine the existence of ground and polarity faults. The detector includes a first current-controlled switch configured to turn on if an open ground or polarity fault exits. A second current-controlled switch is controlled by the first current-controlled switch. The second current-controlled switch controls a power switch. The power switch is connected to the power supply, and configured to provide AC power from the source of AC power to the at least one receptacle based on whether a ground or polarity fault exists.

In another embodiment, the invention provides a method of detecting a ground or polarity fault in a source of single-phase, AC power, where the source has a hot lead, a neutral lead, and a ground lead. The method includes converting an AC signal from the source to a DC signal in a power converter; connecting the power converter to a power switch and the ground lead; and monitoring the ground lead of the source with a fault detector connected to the power switch. The fault detector is configured to determine the presence of ground and polarity faults. The method also includes controlling the power switch with the fault detector, and connecting at least one receptacle to the power switch.

Additional features and embodiments of the invention are described below.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
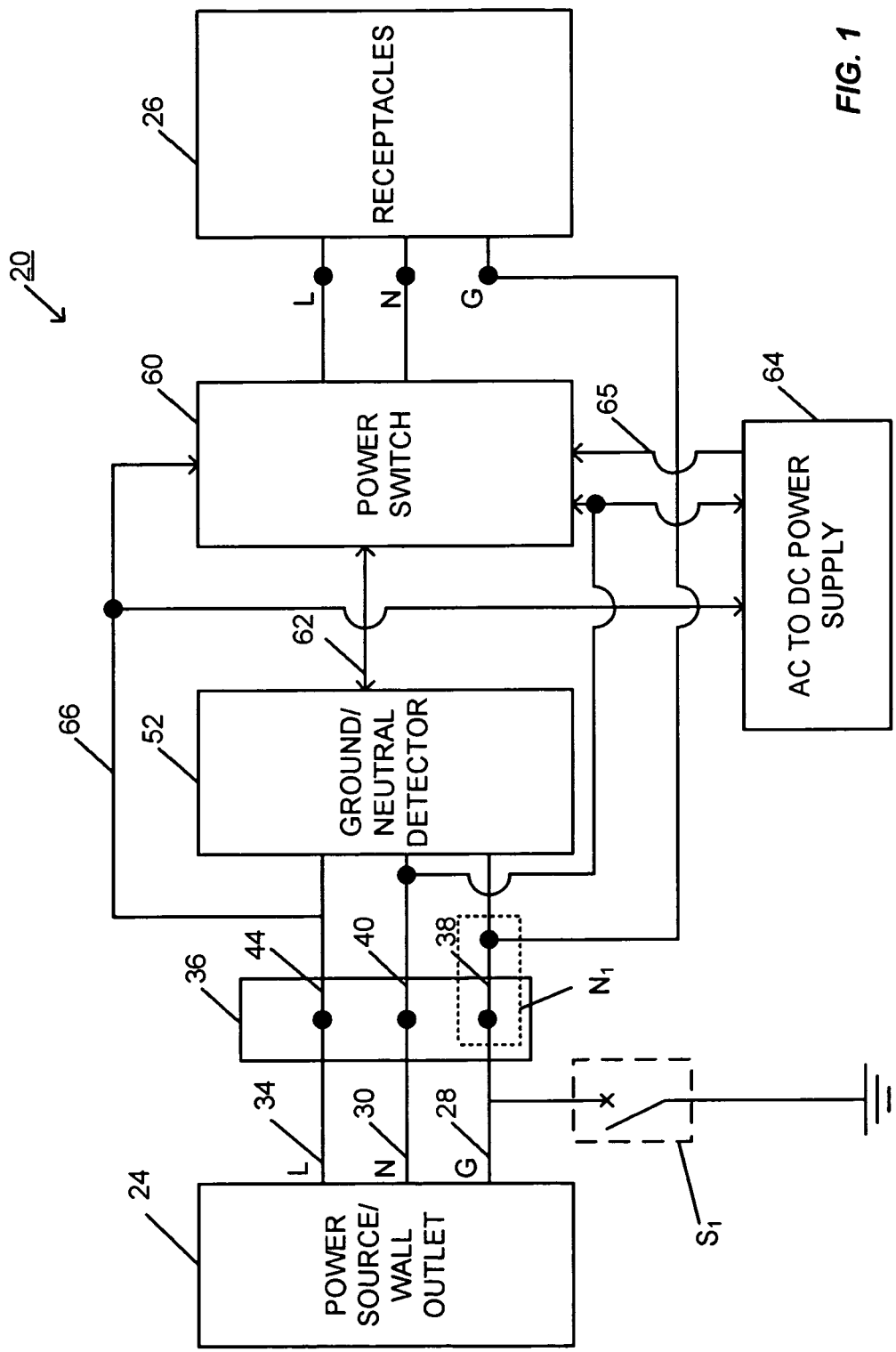
FIG. 1 is a block diagram of a relocatable power tap connected to a power source.

FIG. 1 schematically illustrates a relocatable power tap 20 that is connected to and designed to transfer AC power ("line power") available from an AC power source ("line source" or "power source") 24, such as a wall outlet, to receptacles 26. The line source 24 includes a ground conductor 28, a neutral conductor 30, and a hot or line conductor 34. The relocatable power tap 20 connects to the power source 24 via a plug 36 (shown schematically). The plug 36 has a ground conductor 38, a neutral conductor 40, and line conductor 44. The relocatable power tap 20 includes a ground/neutral detection circuit or fault detector 52 that detects faults, such as loss of ground (or ground fault) and a polarity fault (such as a reverse wiring of the line and neutral conductors in the power source 24). The relocatable power tap 20 includes a normally-open, power switch 60 that provides the line power to the receptacles 26 depending on whether any faults are detected. As will be discussed in greater detail below, the relocatable power tap 20 provides the line power to loads coupled to the receptacles 26 only after no faults have been detected by the detector 52. Thus, potentially dangerous touch currents on the loads, which may result from defective insulation or liquid exposure, may be avoided. In addition, damage to the loads coupled with the receptacles may also be avoided. Further, if a fault is detected while line power is being provided to the receptacles 26, the relocatable power tap detector 52 will control the switch 60 so that the switch opens to interrupt the supply of power to the receptacles.

When the relocatable power tap 20 is coupled to the line source 24 (e.g., when the plug 36 is plugged into a wall outlet), the fault detector 52 checks for defects, such as a ground fault or reverse polarity situation. If no defects are detected, the fault detector 52 controls power switch 60 via communication link 62 so that power is transferred to the receptacles 26. A power converter or supply 64 receives line power from the line source 24, converts the AC signal from the line source 24 into a DC signal or an approximation of a DC signal. As will be discussed in greater detail below, in one embodiment the power supply 64 performs a half-wave rectification of the AC signal from the line source. This rectified signal is delivered to the power switch 60 along line 65. The AC power from the line source 24 is delivered to the power switch 60 on line 66.

The fault detector 52 monitors node N1 to detect one or more fault conditions. For example, in the case where an electrician fails to properly connect the ground conductor 28 to a ground, a ground wire is cut or disconnected, a ground pin in a plug is broken, or some other condition arises where improper grounding occurs (which is shown schematically by a switch S1 in an open position) (note that switch S1 is not part of the invention or the circuit shown in FIG. 1, but used solely for purposes of illustrating a ground fault or open ground condition), a non-zero potential exists at node N1. As will be discussed in greater detail below, in one embodiment, the fault detector is configured to operate when the potential at node N1 is very small. Certain UL standards require RPT's to cut off power to their receptacles if a leakage current of more than 50 µA exists. In one embodiment, an inherent, open-ground leakage current in a path that includes resistors R5 and R6 of less that 30 µA is sufficient to cause the fault detector 52 to control the power switch 60. When there is no ground fault, any leakage current is drained to ground. As will also be discussed in greater detail below, if a reverse polarity situation occurs, the fault detector 52 controls the power switch 60 to keep it open.

The fault detector 52 communicates with the power switch 60 via a trigger signal. If, for example, the fault detector 52 does not detect any ground faults or polarity reversals, the fault detector 52 will communicate a trigger signal on the link 62 to the power switch 60. In response, the power switch 60 will close and the line power is provided to the receptacles 26. If the fault detector 52 detects one or more faults in the line source 24, the fault detector 52 does not provide a trigger signal to the power switch 60. As a result, the power switch 60 will not close.

Figure 2:
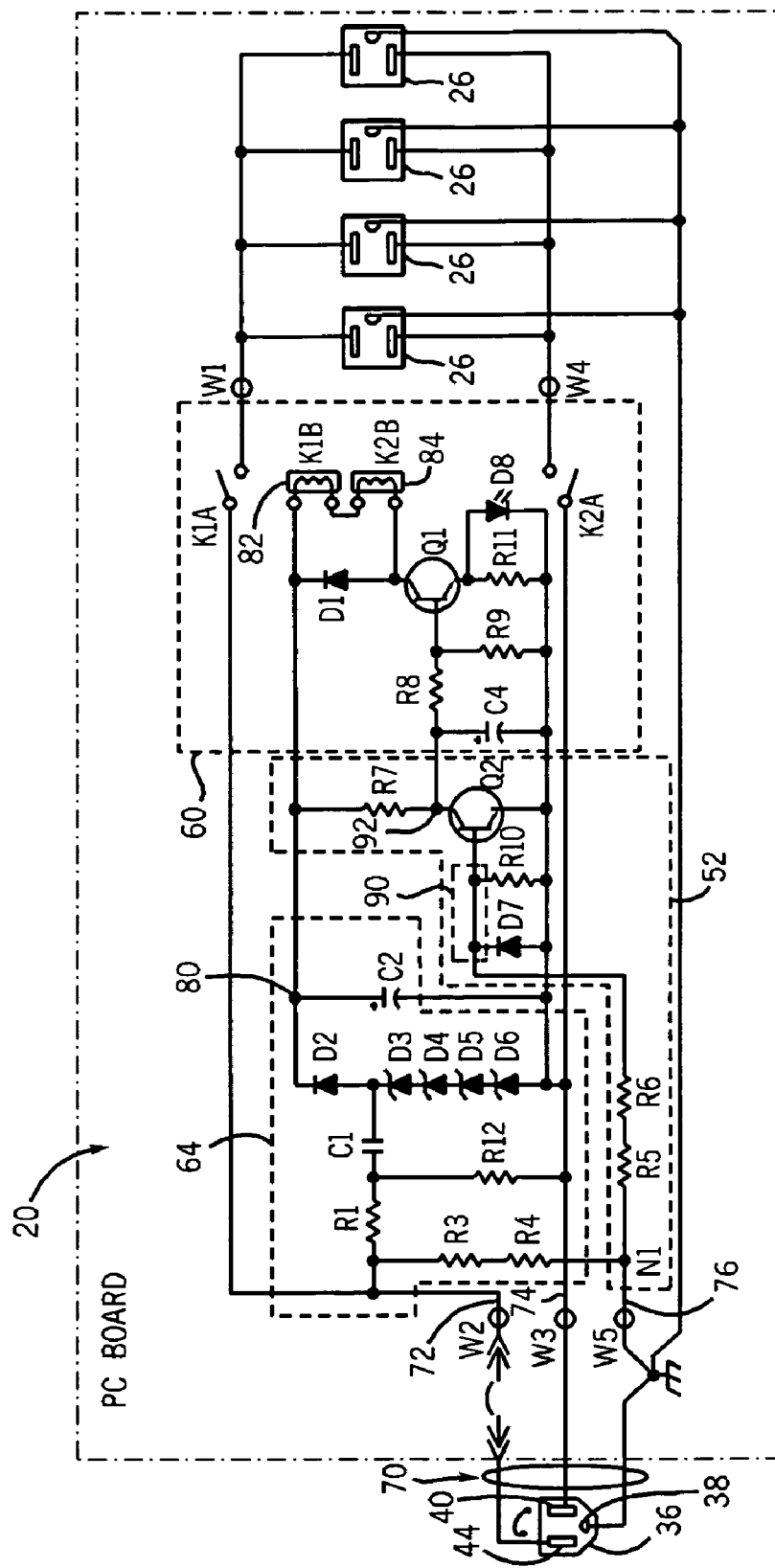
FIG. 2 is a circuit diagram of a relocatable power tap.

FIG. 2 is a more detailed circuit diagram of the relocatable power tap 20. The relocatable power tap 20 includes the plug 36 (which may be a NEMA 5-15P Hospital Grade Plug), and a power cord 70 (such as a 15-foot long, 14 AWG, AC cord). The cord 70 connects to a line or hot node 72, a neutral node 74, and a ground node 76 (which is the same as node N1 from FIG. 1). The relocatable power tap 20 also includes the power supply 64, the ground-neutral detector 52, and the power switch 60. As noted, the power switch 60 controls the transfer of power to or energization of the receptacles 26. In one embodiment, the relocatable power tap 20 includes four receptacles 26 housed in a metal case. The receptacles may be NEMA 5-15R Hospital Grade Receptacles.

In normal operation, meaning that the outlet or line source 24 to which the plug 36 is connected is properly wired and properly grounded, a 120 V AC signal is supplied to node 72. In addition, the neutral node 74 is at a low or zero potential with respect to the ground node 76, and the ground node 76 is connected to a ground potential (presumably a low or zero potential). In practice, when the line source is properly configured, the ground node 76 is connected to the ground at an electric service panel or circuit breaker service box (not shown) and the potential difference between neutral and ground is usually less than 6 volts. The 120 V AC signal is delivered to the power supply 64, which includes resistor R1, capacitor C1, diode D2, and capacitor C2. Resistor R1 and capacitor C1 condition the AC signal received from node 72 and diode D2 half-wave rectifies the AC signal. Capacitor C2 helps smooth the half-wave rectified signal so that it more closely approximates a DC signal. However, there is still some time-varying component in the signal at node 80. This component is commonly referred to as a ripple. Note that it is desirable to design the converter 64 so that it is in expensive. Although a full-wave rectifier can be used, when implemented with a half-wave rectifier converter 64 tends to be less expensive. In addition, it is also desirable to design converter 64 so that it is able to cope with variations in the power actually available from a wall outlet. In the embodiment shown, the rectifier can handle input signals ranging from about 90 to 140 VAC. Even though outlets are supposed to provide 120 VAC, this does not always happen in practice.

The power supply 64 also includes four, series-connected 12 volt Zener diodes D3-D6, which limit the maximum voltage at the positive side of capacitor C2 (or node 80) to approximately 48V. A different number of Zener diodes, such as one Zener diode rated at 48V, could be used to limit the voltage. The neutral node 74 forms the negative or low potential side of the power supply 64.

The signal at node 80 drives the coils K1B and K2B of relays K1 and K2 of power switch 60. (Note that sometimes the term power switch is used to refer to only those components that directly control the provision of power to the receptacles, e.g., the relays.) When the coils K1B and K2B are energized (i.e., a current is flowing through them), contacts K1A and K2A are closed. When the contacts K1A and K2A are closed, nodes 72 and 74 are connected to the receptacles 26. Although the presence of a signal at node 80 is necessary to energize the relays K1 and K2, the relays will not close unless a path to a low potential (i.e., node 74) is provided through Q1. In other words, Q1 must be switched on before the relays K1 and K2 can be closed. As will be discussed, in greater detail, transistor Q1 is controlled by transistor Q2. It should also be noted that one or more triacs could be used instead of relays K1 and K2.

The control node or base 90 of Q2 is connected to node 76 (or N1) through resistors R5 and R6. If a potential exists at node 76 (such as when an open ground exists), a small base or turn-on current is provided to Q2 through resistors R3, R4, R5, and R6. If the line source is wired incorrectly (i.e., the line and neutral leads are reversed with respect to a connected ground), the line node 72 is at a low potential and the neutral node 74 is at high potential. When the relocatable power tap 20 is connected to an improperly wired outlet or line source (in other words a polarity fault exists), resistors R3 and R4 are pulled high with respect to the neutral (node 74), even if the ground node 76 is properly connected.

In response to a base current through R5 and R6, Q2 turns on and the voltage at Q2's collector 92 is pulled low. This, in turn, turns off Q1 (i.e., any current that may have been available to the base of Q1 is now directed to a low potential). As noted, if Q1 is off, the relays K1 and K2 are not energized and power is not provided to the receptacles.

If there is no ground or reverse polarity fault, Q2 is off. In addition, resistors R7 and R8 supply a base current (trigger signal) to transistor Q1, which enables transistor Q1 to conduct. The current from resistor R7 is filtered to help reduce the ripple component by capacitor C4 and resistor R8. When conducting, transistor Q1 is a low-side switch and allows current to flow through resistor R11, light-emitting diode ("LED") D8, and coils K1B and K2B. LED D8 is used to provide a visual indication to an end user that two conditions exist: 1) a proper ground and 2) correct wiring of the line source. In other words, LED D8 is lit when no faults exist. In general, the LED D8 is a type of lamp and other lamps or lights could be used. In addition, other types of indications or indicators (such as buzzers, LCDs, etc.) could be used in place of or in addition to the LED D8.

In one embodiment, transistor Q2 is a high-gain, Darlington-type transistor. Super or high Beta transistors might also be used. Under normal conditions (i.e., no ground fault and no polarity reversal), Q2 is held off by resistor R10.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A relocatable power tap comprising:
    at least one receptacle;
    a power supply configured to convert an AC signal to a DC signal;
    a fault detector configured to determine the existence of ground and polarity faults in a power source, the fault detector including a first current-controlled switch configured to turn on if an open, ground, or polarity fault exists;
    a power switch controlled by the detector, connected to the power supply, and configured to communicate AC power from the power source to the at least one receptacle according to whether the fault detector detects a fault, the power switch including a second current-controlled switch controlled by the first current-controlled switch; and
    a path to a ground connected to the at least one receptacle.

2. The relocatable power tap of claim 1, wherein the detector is further configured to generate a human recognizable indication when no faults are detected.

3. The relocatable power tap of claim 2, wherein the human recognizable indication is light generated by a lamp.

4. The relocatable power tap of claim 1, wherein the switch includes a normally-open switch.

5. The relocatable power tap of claim 4, wherein the switch includes at least one relay.

6. The relocatable power tap of claim 1, wherein the power supply includes a half-wave rectifier.

7. The relocatable power tap of claim 1, wherein the power supply includes one or more series connected diodes.

8. The relocatable power tap of claim 1, wherein the detector is further configured to drain a leakage current to ground.

9. The relocatable power tap of claim 1, wherein the detector is configured to operate based on a leakage current of 50 μA or less.

10. The relocatable power tap of claim 1, wherein the second current-controlled-switch is a low-side switch.

11. The relocatable power tap of claim 10, wherein the first current-controlled switch is a high-gain, Darlington-type transistor.

12. A relocatable power tap comprising:
    a plug configured to connect to a source of AC power;
    at least one receptacle;
    a power supply connected to the plug and configured to convert an AC signal to a DC signal;
    a detector connected to the plug and configured to detect ground and polarity faults, the detector including a first current-controlled switch configured to turn on if an open ground or polarity fault is detected, and
    a power switch having a second current-controlled switch controlled by the first current-controlled switch, the power switch connected to the power supply, and configured to communicate AC power from the source of AC power to the at least one receptacle based on whether a ground or polarity fault is detected.

13. The relocatable power tap of claim 12, wherein the detector is further configured to generate a human recognizable indication when no faults are detected.

14. The relocatable power tap of claim 13, wherein the human recognizable indication is light generated by an LED.

15. The relocatable power tap of claim 13, wherein the switch includes a normally-open switch.

16. The relocatable power tap of claim 14, wherein the switch includes at least one relay.

17. The relocatable power tap of claim 12, wherein the power supply includes a half-wave rectifier.

18. The relocatable power tap of claim 12, wherein the detector is further configured to detect the fault based on a leakage signal.

19. The relocatable power tap of claim 18, wherein the power supply includes one or more series connected diodes.

20. The relocatable power tap of claim 12, wherein the detector is configured to operate based on a leakage current of 50 µA or less.

21. The relocatable power tap of claim 12, wherein the first current-controlled switch is a high-gain, Darlington-type transistor.

* * * * *